United States Patent [19]
Chen et al.

[11] Patent Number: 5,276,531
[45] Date of Patent: Jan. 4, 1994

[54] METHOD AND APPARATUS FOR HIGH DEFINITION IMAGING

[75] Inventors: Kok Chen, E. Palo Alto; Randall G. Guay, Cupertino, both of Calif.

[73] Assignee: Apple Computer, Inc., Cupertino, Calif.

[21] Appl. No.: 768,133

[22] Filed: Sep. 27, 1991

[51] Int. Cl.⁵ .............................................. H04N 1/41
[52] U.S. Cl. .................................... 358/443; 358/426; 358/467; 358/133
[58] Field of Search ............... 358/400, 404, 426, 429, 358/261.1, 261.2, 261.3, 261.4, 443, 444, 455, 456, 460, 465, 466, 467, 470, 75, 133; 382/56

[56] References Cited
U.S. PATENT DOCUMENTS
4,266,249  5/1981  Chai et al. ............................ 358/429
5,079,630  1/1992  Golin et al. .......................... 358/133

Primary Examiner—Edward L. Coles, Sr.
Assistant Examiner—Jerome Grant
Attorney, Agent, or Firm—Stuart J. Madsen

[57] ABSTRACT

An apparatus and method for producing high definition output images using an encoding scheme for differentiating between differing data types and context sensitive pixel modulation for dynamically shifting pixel growth direction during post-processing manipulation of the data.

21 Claims, 6 Drawing Sheets

METHOD AND APPARATUS FOR HIGH DEFINITION IMAGING

BACKGROUND OF THE INVENTION

1. Field of the Invention:

The present invention relates generally to imaging apparatus and methods, and more particularly to an apparatus and method for producing high definition images using intelligent post-processing of encoded data and context sensitive pixel modulation.

2. Brief Description of the Field:

With the technological advances made in the field of computer imaging devices, i.e., monitors and printers, increased emphasis has been applied to achieving clearer and higher resolution output with increased cost effectiveness. This drive for a "better picture" has resulted in an influx of high quality printing and display techniques, and the practical extinction of the lower quality prior art devices.

Traditional imaging systems normally produce a final output image using two distinct steps. In a first step, imaging data is commonly encoded and placed into a frame store. In a second step, when the frame store is at least partially filled, this encoded data is extracted and transmitted to a marking device, i.e., a printer. Traditionally, the frame store has contained the precise marking pattern to be utilized by the marking device when producing the final output image.

For example, in a typical prior art bi-level imaging system, with a marking device capable of either creating a mark at a given spot or leaving the spot blank, the frame store consists of binary memory with each bit in the memory representing a spot on the device's output medium. For imaging systems which include marking devices capable of imaging in multiple colors or gray levels, each spot to be imaged by the device is represented by a corresponding multibit data pixel in the frame store that specifies the color or luminance of that particular spot. When producing a grayscale image, a modulator takes this multi-bit data pixel and attempts to create a gray level over the area addressed by that pixel by writing "black" in a small imaged area in a field of "white." The human eye perceives the average of this area as a gray level.

Unfortunately, traditional methods of encoding and imaging allow only straight-forward post-processing (processing performed after transmission of the imaging data from the CPU) of the frame-stored data. Additionally, certain imaging devices, particularly laser scanning electrophotographic print engines, have more addressable points than their resolution supports. In other words, data pixels which do not overlap in the system's pixel map will overlap in the imaging device. A direct result of this is that writing a gray level next to a black, gray or white area all produce different final output image results.

One method for achieving better resolution in the final output image when producing a grayscale image is to use pulse width modulation to image the output pixels. Briefly, pulse width modulation is a technique for subdividing each output pixel into a much smaller unit (in the above example, the unit of time that the laser is writing "black"). As an example of the benefits of pulse width modulation, let us assume that we have an imaging area comprised of a 4-pixel-by-4-pixel cell. Given the parameters of this cell, using traditional modulation we can achieve 17 gray levels (0/16, 1/16, 2/16, ..., 16/16). A 5-pixel-by-5-pixel cell would enable us to achieve 26 gray levels, and so on. The main problem is that we need substantially more than 30 levels of gray in order to produce a final output image with good resolution without contouring. However, using the traditional method of imaging, the imaging area becomes too large when trying to use more than a 4-pixel-by-4-pixel imaging area.

We can overcome this limitation and squeeze more gray levels out of the 4×4 area by turning on partial pixels. That is, by dividing an output pixel into smaller units, we can achieve a substantially greater number of gray levels using the same imaging area. For instance, we could now have 0.6/16 as one achievable gray level (as opposed to the simple integer combinations described above).

However, a consequence of using pulse width modulation to image gray levels is that the position of dot growth can become very important. The "dot" produced by the laser can usually grow from the center, left, right, or in from the edges. Depending on the neighboring pixels surrounding the current pixel (the output pixel being currently imaged), differing results in gray level imaging can occur. Thus, there arise many situations in which one wants to add gray to the specific right or left of a given pixel to increase the resolution of the final output image and enhance the final overall output image quality.

In traditional systems, shifting the portion or direction of pixel growth is done by relating a code word to the partial pixel being imaged. For example, 0001 could be used to designate a small pixel growth from the right and 1000 could be used to designate the same pixel growth, but from the left. Thus, when it is desired to shift the pixel growth toward a given imaged area, a code word would be associated with the partial pixel to be imaged in a manner that would enable this shifting. Unfortunately, this requires more frame store space in which to store the additional codewords to indicate pixel growth direction. This, consequently, greatly increases the cost of the imaging device.

SUMMARY OF THE INVENTION

The apparatus and method in accordance with the preferred embodiment of the present invention eliminate the post-processing limitations imposed by prior art devices by enabling any post-processing apparatus to recognize and delineate between differing data types. This provides the post-processing apparatus with the ability to perform different operations on differing data types, resulting in a substantially improved final output image.

In the preferred embodiment, differing data types are encoded differently before being placed into the frame store. For example, text and graphics information is encoded using a first set of values whereas continuous-toned image information is encoded using a second set of values, different from the first. With the identity of the differing data types intact in the frame store, the post-processing apparatus can identify an individual data type and perform an operation on only that type. For example, if the post-processing phase includes an anti-aliasing device, the device would be capable of differentiating between text data and grayscale image data. It could then operate on the text data while allowing the image data to pass through without modification. This effectively enables the anti-aliasing device to enhance the appearance of the text data while avoiding the degradation of image data in the process.

The apparatus and method in accordance with the preferred embodiment also eliminates the pixel growth and memory allocation limitations imposed by prior art devices by enabling the modulator to assume responsibility for intelligently shifting pixel growth direction when producing a grayscale image. The pixel map (frame store) sends a multibit representation of the output pixel data for a given grayscale image to the modulator (encoded with a grayscale value, as described briefly above). This output pixel data contains only grayscale level information and no information relating to dot growth direction. The modulator hardware examines each output pixel's immediate neighbors to determine how to modulate the print engine based on the adjacent output pixel data. The imaged portion of the pixel being modulated (the "current pixel") is shifted towards other imaged pixels to cause the imaged portion of the current pixel to be placed adjacent to other imaged portions. This allows codes reserved for images to dynamically shift left or right depending on the surroundings, and allows the maximizing of gray levels that can be represented while reducing imaged to non-imaged transitions. In a laser scanned synchronous printing device, this reduces the intensity of engine artifacts, saves memory, and increases print quality.

IN THE DRAWING

DETAILED DESCRIPTION OF THE PREFERRED EMBODIMENT

Generally, the prior art imaging systems and methods normally employed in today's imaging field comprise a number of data sources or generators coupled to a frame store. The output from the frame store is coupled through a data transformation device to a marking device which produces a final visual output image. For the purposes of explanation of the preferred embodiment, the term "data generator" has been used to denote devices which provide imaging information in digital form. For example, devices which provide scanned images, font rasterizations, line art, and the letter "E" would all be considered data generators. The term "frame store" has been used to denote in general the group of devices normally referred to as frame buffers, bit maps, pixel maps, band buffers, FIFOs, etc. The term "data transformation device" has been used to denote devices, circuits, etc. which act to transform the frame store data into an exact bit pattern used by the marking device to produce a final output image.

Figure 1:
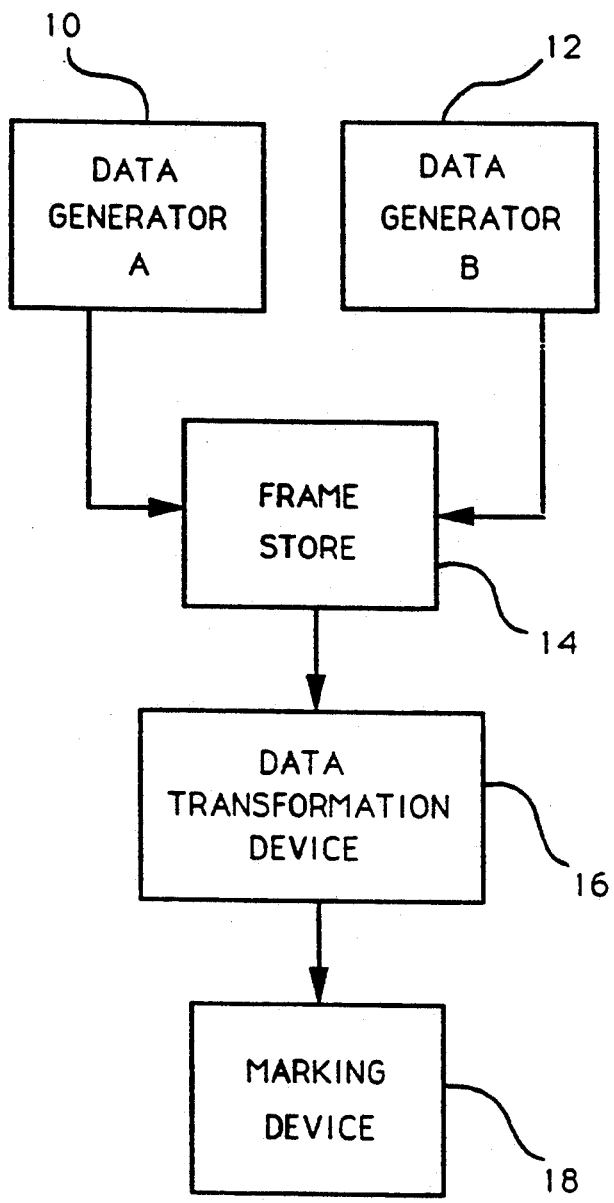
FIG. 1 is a block diagram illustrating a prior art imaging system and method.

Referring to the specific prior art embodiment illustrated in FIG. 1, two separate data generators, Data Generator A 10 and Data Generator B 12, are coupled to a single Frame Store 14. For the purposes of illustration, we will assume that the data from Data Generator A 10 is text data (i.e., the letter "E"), and the data from Data Generator B 12 is grayscale image data (i.e., a photograph that has been digitized by a scanner). The output from Frame Store 14 is coupled to the input of a Data Transformation Device 16, the output of which is coupled to a Marking Device 18. For the purposes of the present explanation, we will assume that Marking Device 18 is a printer.

Traditionally, in non-grayscale systems, the method employed for storing data from the data generators in the frame store involves storing a bit of information in the frame store to represent a corresponding output position on a piece of printer paper (or, more generally, a corresponding output position on any imaging apparatus, i.e., a computer monitor, etc.). Newer devices utilize more bits at each location in the frame store to enable representation of various grayscale levels or colors at a single corresponding output position. In either case, there is normally a one to one (pixel to pixel) correspondence between the final output image and the frame stored data. In the prior art system depicted in FIG. 1, data from Data Generators 10 and 12 is initially stored in Frame Store 14 in exact correspondence to the bit pattern used to produce a final visual output image, as described above. The data stored in Frame Store 14 is then transmitted to Data Transformation Device 16, which is normally operative to perform some type of post-processing operation on the data, ie., anti-aliasing. The transformed data from Data Transformation Device 16 is then input into Marking Device 18 (in this example, a printer) which actually produces the final visual output image.

A significant inadequacy in this type of system results from the common encoding of data from the data generators. This encoding method allows only common post-processing operations to be performed on the data output from the frame store. That is, once the data from Data Generators 10 and 12 is input into Frame Store 14, the data's source identity is lost. Thus, expanding on the example above, text data (from Data Generator A 10) and grayscale image data (from Data Generator B 12) are encoded in the same manner and appear the same once stored in the frame store. The result is that all of the stored data output from Frame Store 14 now looks the same to Data Transformation Device 16, which cannot delineate between the original text data and image data. Unfortunately, a consequence of this encoding scheme is that any post-processing performed on the output data from Frame Store 14 must now be performed on both the text data and the grayscale image data. This situation ultimately results in a substantial degradation of the final output image.

The major reason for this image degradation is that most post-processing procedures are data type sensitive. In other words, certain post-processing may be appropriate for one type of data, i.e., text, but inappropriate for another data type, i.e., grayscale images. A specific example of one type of this "data-type-sensitive" post-processing is anti-aliasing. Anti-aliasing is a technique well known in the art and is, simply stated, a refinement in the horizontal direction of the edges of text or graphics. It is normally used to smooth the edges of text in order to enhance the appearance of the final output image. However, anti-aliasing is normally inappropriate for grayscale images. Grayscale images are formed by combining pixels into pixel groups in accordance with a desired grayscale level. If an anti-aliasing pass is made on the grayscale image data corresponding to a given pixel group, and an "edge" in this group is "smoothed," the ratio of gray in the pixel group will change, and the final grayscales portion of the output image will be negatively affected.

The present invention obviates the post-processing problems inherent in the prior art devices by enabling the data transformation device to recognize and delineate between differing data types. Generally, this is achieved by storing intelligent numbers in the frame store corresponding to the specific data from which the numbers were generated. For example, text data would be encoded using a values, different from the first. This would enable the data transformation devices appropriate for text to recognize and operate only on text data, and, likewise, enable the data transformation devices appropriate only for grayscale images to recognize and operate only on grayscale image data. The result is a final output image with very high contrast, sharp text, and images which appear continuous, smooth and correctly leveled.

Figure 2:
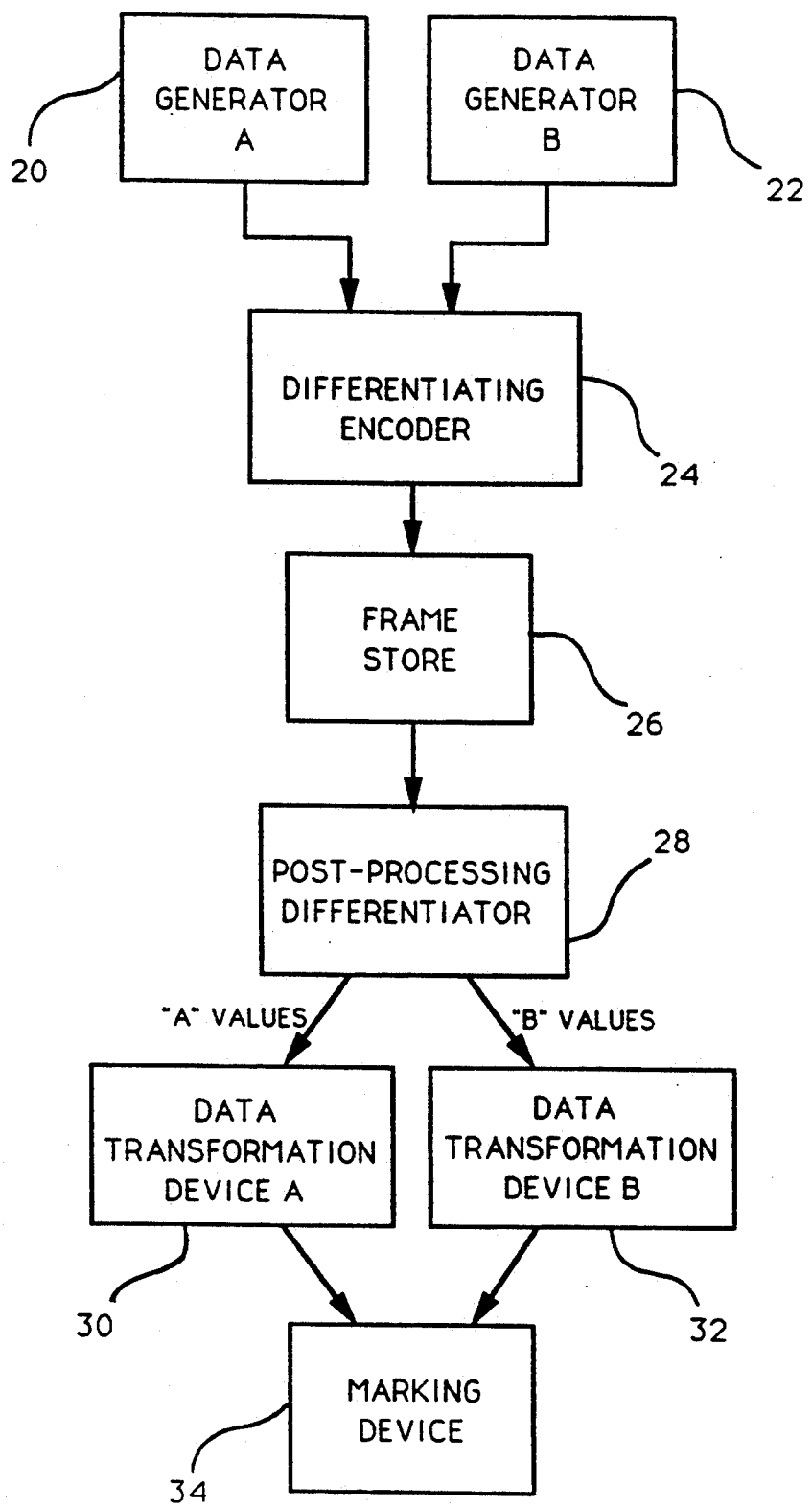
FIG. 2 is a block diagram illustrating an imaging system and method in accordance with the preferred embodiment of the present invention.

Referring now to FIG. 2, shown is a block diagram illustrating the preferred apparatus and method for enabling intelligent post-processing of differing data types in accordance with the present invention. A first data generator, Data Generator A 20, and a second data generator, Data Generator B 22, are coupled to a Differentiating Encoder 24. The output from Differentiating Encoder 24 is coupled to the input of a Frame Store 26, the output of which is coupled to the input of a Post-Processing Differentiator 28. The output from Post-Processing Differentiator 28 is split according to the source of the data stored in Frame Store 26. Data originally from Data Generator A 20 is coupled to the input of a Data Transformation Device A 30, data originally from Data Generator B 22 is coupled to the input of a Data Transformation Device B 32. The outputs from Data Transformation Device A 30 and Data Transformation Device B 32 are coupled to the input of a Marketing Device 34.

To illustrate the advantages of the preferred embodiment, we will once again assume that the data output from Data Generator A 20 is text data and that the data output from Data Generator B 22 is grayscale image data. Likewise, we will once again assume that Marking Device 34 is a printer. When the data from the data generators is input into Differentiating Encoder 24, text data from Generator 20 is encoded with a first set of "A" values, say, 1-10, and grayscale image data from Generator B 22 is encoded with a second set of "B" values, say 11-20. The encoded data output from Differentiating Encoder 24 is then sequentially stored in Frame Store 26. Both the encoding of the data from the data generators and the storage of the data in the frame store are achieved using methods well known in the art.

When the frame store contains an appropriate amount of data to begin transmission to the marking device (normally after the frame store has been filled), the data is sequentially input into Post-Processing Differentiator 28. Differentiator 28 is operative to recognize the encoded data and to delineate between the original text data and grayscale image data. That is, Differentiator 28 recognizes the values 1-10 as being "A" value text data from Data Generator A 20, and the values 11-20 as being "B" value grayscale image data from Data Generator B 22. This enables the post-processing differentiator to transmit the text data to Data Transformation Device A 30, and grayscale image data to Data Transformation Device B 32.

The main advantage of this post-processing split of the frame stored data is that different post-processing functions can now be applied to the data according to data according to data type. For example, Data Transformation Device A 30 could be an anti-aliasing chip appropriate only for text data, as described in detail above. Because Device A 30 receives only "A" value text data, anti-aliasing is performed only on the text data before transmission to Marking Device 34. The "B" value grayscale image data is passed through Data Transformation Device B 32, which could perform a function appropriate only for grayscale image data (ie., context sensitive pixel modulation, as described in detail below), and passes to Marking Device 34 untouched by the anti-aliasing process. This gives the desired results of high contrast, sharp text output and visually superior continuous grayscale output from the marking device.

Of course the embodiment illustrated in FIG. 2 is only one of a number of possible system configurations. Any number of data generators could be coupled to the differentiating encoder, or there could be a single data generator operating in different modes. For instance, image overlays comprised of transparent, translucent or opaque images may be created by a single data generator operating in different modes. However, as far as encoding for post-processing purposes is concerned, each mode would be perceived as a separate data generator and would be encoded with differing data type values. Additionally, the function of the post-processing differentiator could be handled by the data transformation device. For example, Data Transformation Device A 30 and Data Transformation Device B 32 could be integrated into a single unit. This unit would listen to a single data stream from Frame Store 26 and would include the functionality to split the data stream from the frame store according to data type (in a manner similar to that described above). The unit could then perform the appropriate post-processing operations on the corresponding appropriate data types.

Another important alternative to the embodiment as depicted in FIG. 2 is an imaging system that does not rely on a frame store to store data for transmission to the marking device. That is, it is specifically contemplated that one embodiment of the present invention includes a single data generator, or plurality of data generators, which encode data according to data type, but which transmit this encoded data directly to the data transformation device. Using FIG. 2 for illustration, Data Generator A 20 and Data Generator B 22 would still be coupled to Differentiating Encoder 24 as described above. However, in this embodiment, the output from Encoder 24 would be directly coupled to the input of Post-Processing Differentiator 28. The rest of the imaging system would function and interrelate in exactly the same manner as described in detail above.

It is equally important to note that the preferred apparatus and method described above are also appropriate for the color system environment. For example, we may want to perform anti-aliasing on all blue text, but would want blue images to remain smooth and continuous. In this instance, blue text data would be encoded using a first set of values, and blue image data would be encoded using a second set of values, different from the first. The resulting final output image would have the same benefits as those described in the grayscale context described in detail above.

Figure 3:
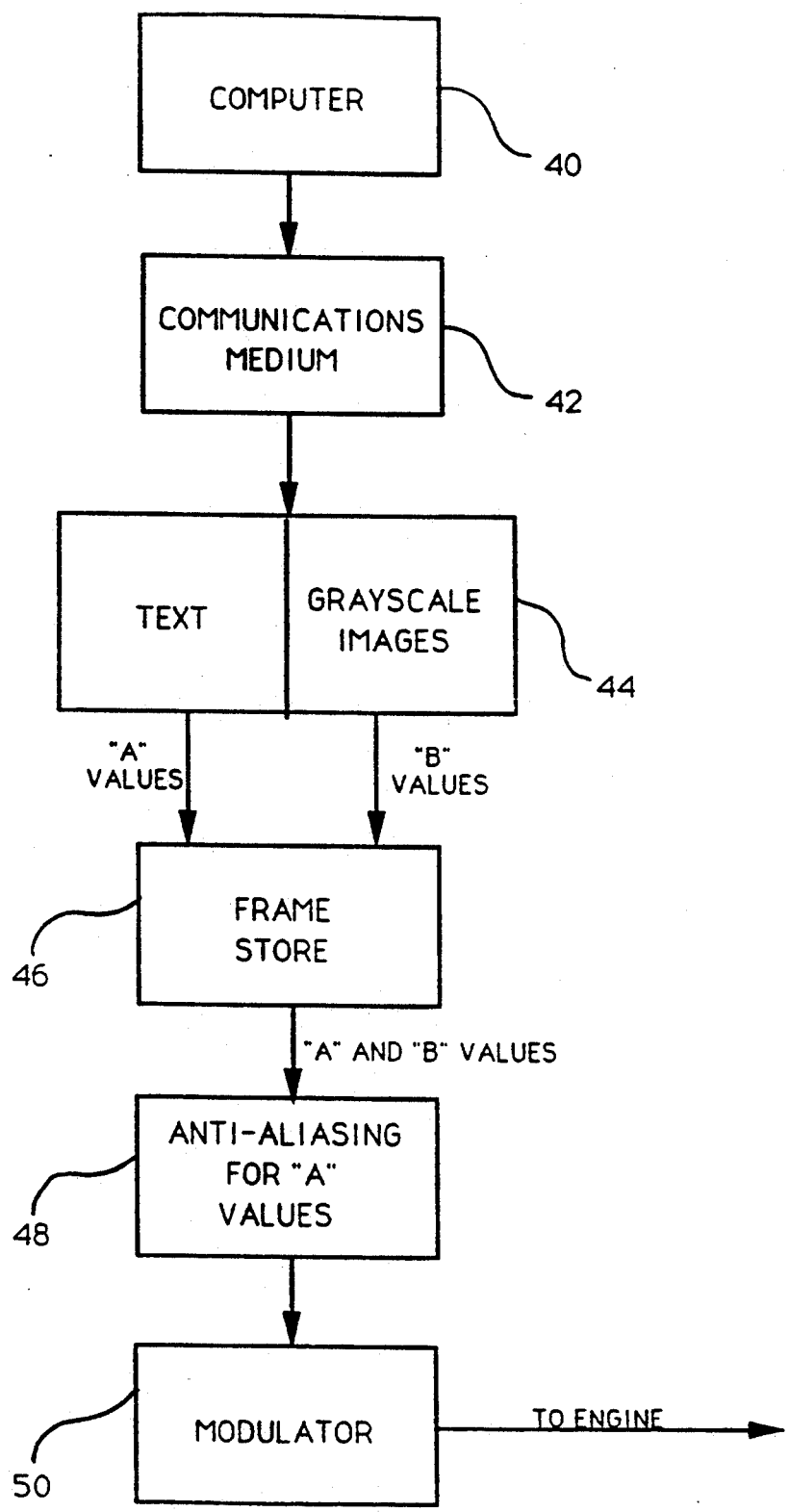
FIG. 3 is a block diagram illustrating an alternative embodiment of the imaging system and method in accordance with the present invention.

To further illustrate the present invention, we will now refer to the alternative embodiment depicted in the block diagram of FIG. 3. Shown is a computer 40 coupled via a Communications Medium 42 to an Interface Controller 44. Interface Controller 44 could be a hardware or software device, but is normally a language program for encoding data in a format appropriate for use by an imaging device, i.e., printer. For the purposes of illustration in FIG. 3, Controller 44 is divided into two separate modules, one for text, and one for grayscale images. This division was made to emphasize the fact that the controller encodes the input data according to data type before outputting the encoded data to the framestore, Framestore 46 in FIG. 3. A common output data stream from Frame Store 46 is passed through an Anti-Aliasing Device 48 to a Modulator 50, and then on to the print engine.

In this example, the language program (Controller 44) interprets the input data stream from the communications medium and encodes the data according to data type. Text data would, for example, be encoded with "A" values, whereas, grayscale image data would be encoded with "B" values. Thus, when the output from the program is input into Frame Store 46, the frame store is sequentially filled with intelligent numbers representative of original data type. As the framestore outputs this encoded data to Anti-Aliasing Device 48, the device is able to differentiate between the "A" value data and the "B" value data, and to operate on only the "A" data. Thus the "A" value text data can be smoothed by the anti-aliasing process while the "B" value grayscale image data passes through untouched by the anti-aliasing process. The modulator sees the modified "A" data and the original "B" data at it's input and modulates the print engine in accordance with this information. The result, as described above, is a much better final output image.

Figure 4:
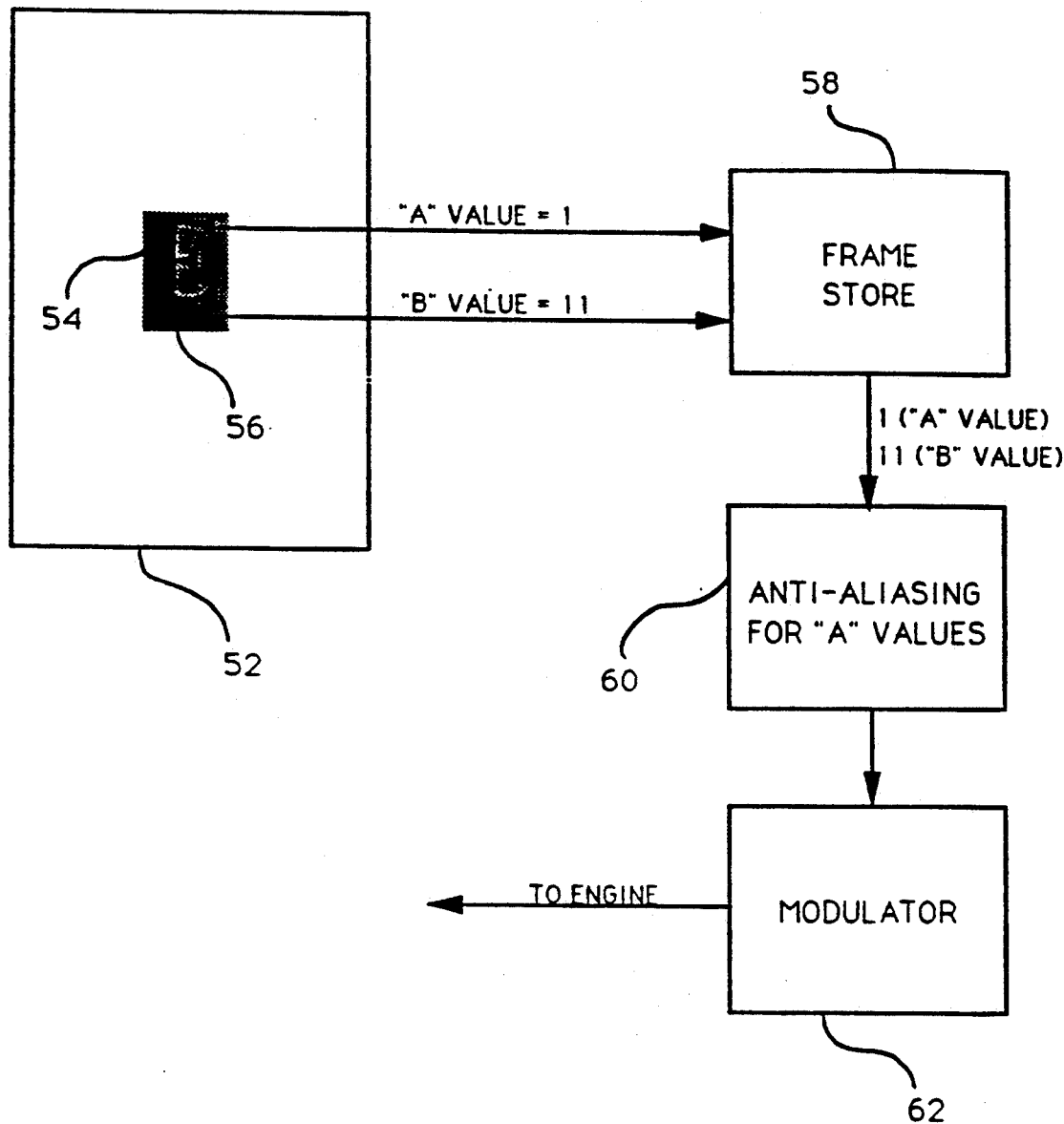
FIG. 4 is a block diagram illustrating a specific example of the operation of the imaging system and method in accordance with the present invention.

Referring now to FIG. 4, depicted is a specific example of the operation of the apparatus and method in accordance with the preferred embodiment of the present invention. Data Block 52 represents a portion of information from the language program (described above) to be imaged. It contains text information, a letter "E" 54, and grayscale information, a Gray Border Area 56 around the "E." As shown, "E" 54 has been encoded with an "A" value of 1, and Gray Border Area 56 has been encoded with a "B" value of 11. These values are input into a Frame Store 58, the output of which is coupled to the input of an Anti-Aliasing Device 60. The output from Device 60 is coupled to the input of a Modulator 62 which drives the print engine as described above.

As is shown in the figure, the data streams to and from Frame Store 58 have retained the original data values output from Data Block 52, where the values were assigned according to data type. Thus, Anti-Aliasing Device 60 is able to differentiate between the input value "1" (an "A" value) and the input value "11" (a "B" value), and to operate on only the "1." The "11" value will pass through Device 60 unaffected. This means that anti-aliasing will only affect text data "E" 54, and will not affect the grayscale level of Gray Border Area 56, resulting in the desired high quality final output image.

Now, turning to a closer examination of the post-processing of the imaging data, the method of context sensitive pixel modulation will be described in detail. As described briefly above, it is often desirable to add a non-integral amount of black to the right or left of a given pixel in order to increase the number of gray levels in the final output image. This has traditionally been done by using a separate codeword to explicitly control the manner in which the pixel is grown. One of the advantages of the apparatus and method of the present invention resides in the modulator's ability to assume the responsibility for controlling right or left pixel growth, thus freeing the frame store memory that would otherwise have to be dedicated to storing this information. That is, the post-processing portion of the imaging system can determine the appropriate growth direction of an output pixel by examining the pixel's context, i.e., it's neighboring pixels. As a specific example, if a black pixel is located to the left of the current pixel, and a white pixel is located to the right of the current pixel, then the current pixel would be modulated to grow from the left. This allows a single codeword to be used to represent a fractional growth in black, regardless of growth direction.

Figure 5:
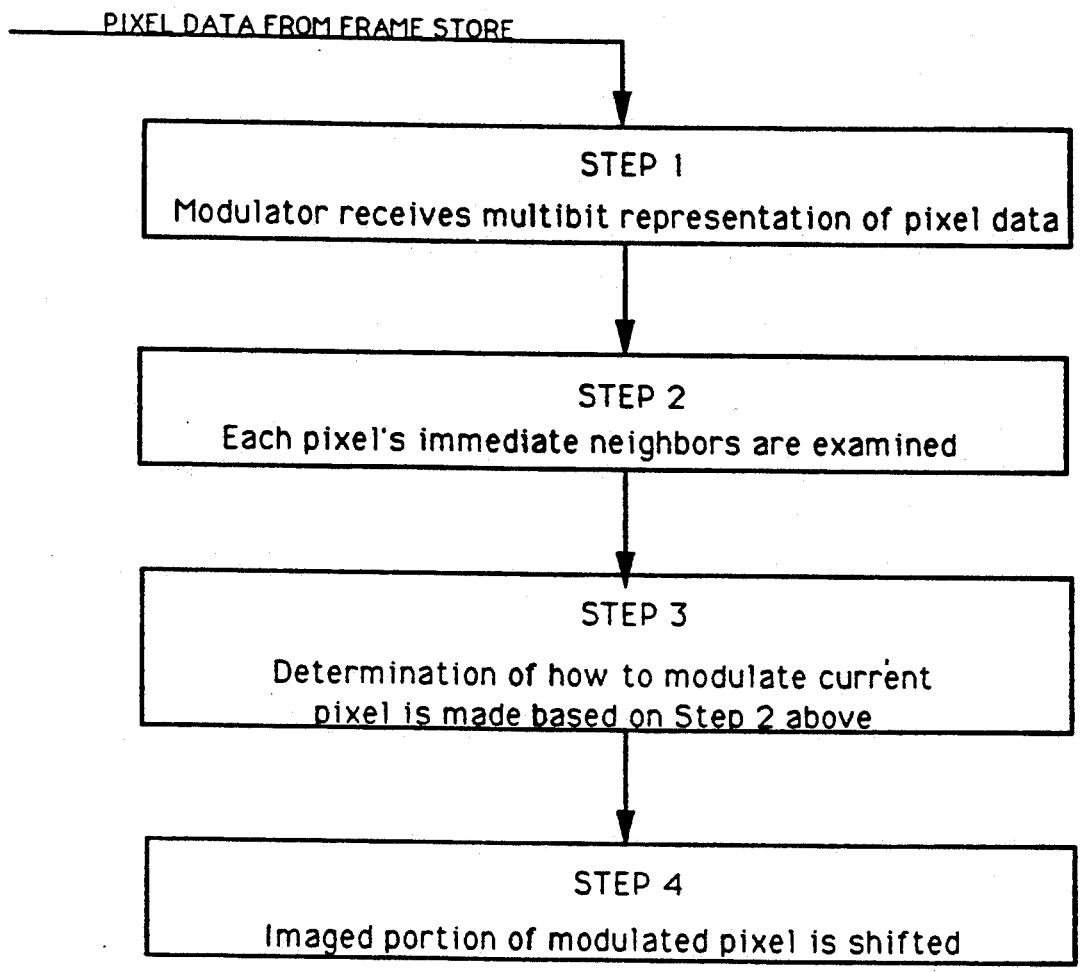
FIG. 5 is a flowchart illustrating the general sequence and steps undertaken by the modulator in performing context sensitive pixel modulation in accordance with the present invention.

Referring now to FIG. 5, shown is a flow chart illustrating the general operation of the modulator in performing the context sensitive pixel modulation described generally above. Pixel data from the frame store has been encoded as described above and is input into the modulator. As illustrated in FIG. 5, in a first step, the modulator receives the multibit representation of the pixel data and identifies it as grayscale image data. This data does not contain dot growth direction information but does, for example, represent that a given individual output pixel is to be imaged ⅛ gray, ¼ gray, etc. In a second step, each output pixel's immediate neighboring pixels are examined. This enables the modulator to accumulate information regarding the gray level of each of the pixels surrounding a given individual pixel. In step 3, a determination of how to modulate the current pixel is made based on the information gained from the second step. And, in step 4, the imaged portion of the current modulated pixel is shifted (or not shifted) in accordance with the determination made in step 3.

Figure 6:
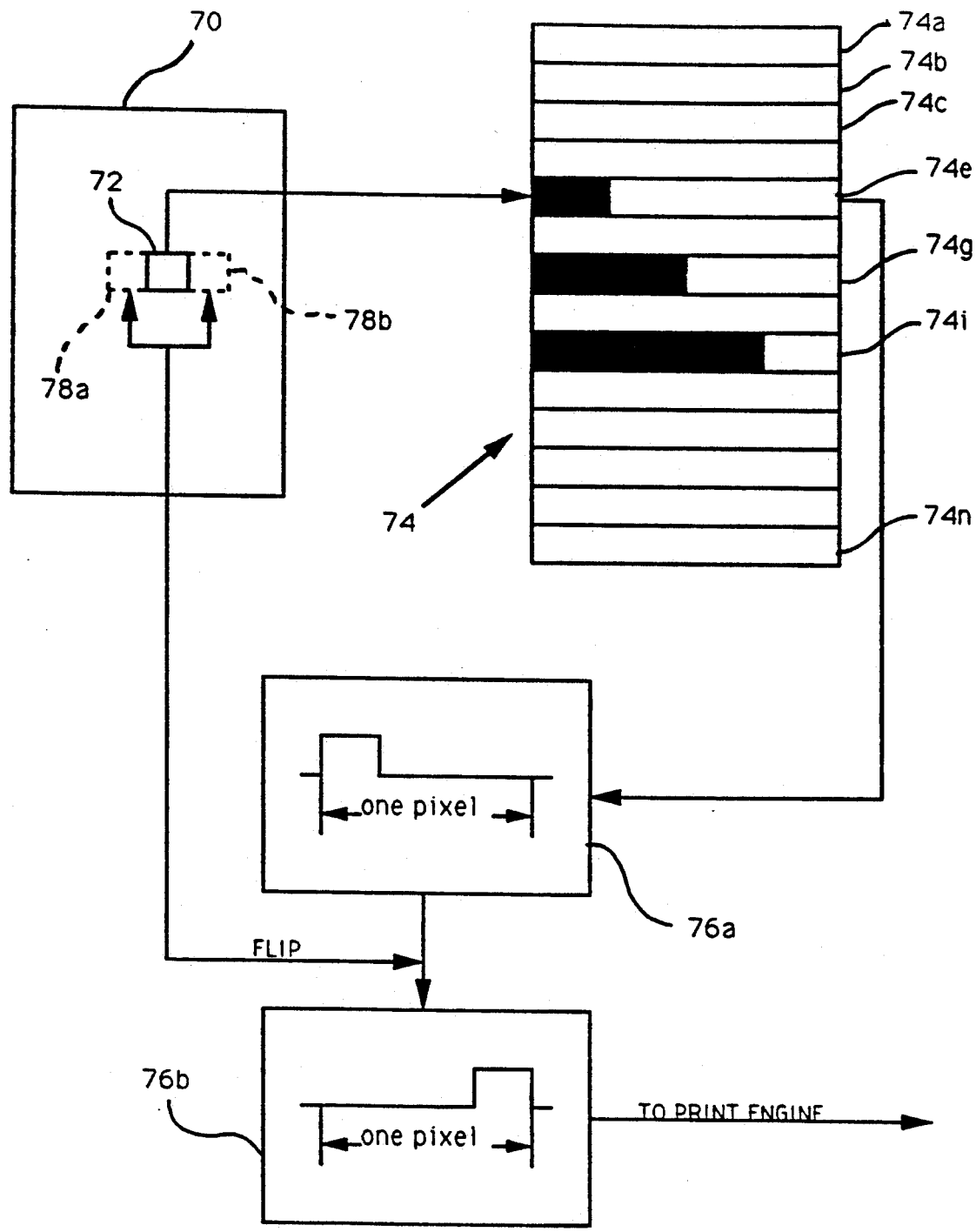
FIG. 6 is an illustration of the specific operation of the context sensitive pixel modulation in accordance with the preferred embodiment of the present invention.

For a more detailed description of the above process, please refer now to FIG. 6. Shown in FIG. 6 is a specific example of context sensitive pixel modulation in accordance with the preferred embodiment of the present invention. For the purposes of the present illustration, Memory Element 70 is representative of a page, or portion, of memory stored in Frame Store 58 (shown in FIG. 4). Pixel Sub-Element 72 is a multi-bit data pixel carrying imaging information relating to a corresponding output pixel. In the preferred embodiment, Pixel Sub-Element 72 is a 4-bit number which is used downstream to index a Lookup Table 74. Although not shown in complete format in FIG. 3, each line of Lookup Table 74 would normally contain imaging patterns similar in construction to those that are shown in the figure.

In the embodiment of FIG. 6, Lookup Table 74 includes 14 Lines, 74a–74n, each of which represents a different modulation pattern for imaging a single output pixel. Each line contains 16 bits of information, each bit translating into either a "black" or "white" image at the print engine. For example, Line 74e would correspond to an output pixel modulation as represented by Output Pixel Modulation Diagram 76a. Modulation Diagram 76a actually represents a timing diagram used to modulate the laser when producing the final output image. Examination of Diagram 76a will show that the pulse corresponds to the portion of Line 74e comprising bits representative of a "black" image, and the trough (flat line portion of the diagram) corresponds to the portion of Line 74e comprising bits representative of a "white" image. Thus, for the amount of time represented by the pulse of Diagram 76a, the laser will image a corresponding portion of the output pixel with "black". For the trough of Diagram 76a, the laser will image the corresponding portion of the output pixel with "white". In the preferred embodiment, each output pixel is divided into 16 parts corresponding to the 16 bits in an individual line of Table 74.

In the implementation of context sensitive pixel modulation as shown in FIG. 6, logic in the modulator is operative to examine Neighboring Pixel Sub-Elements 78a and 78b, which are juxtoposed to Pixel Sub-Element 72. Depending on the information gained by the modulator in relation to this examination, the modulator would either modulate the laser with the exact bit pattern from the appropriate line of Table 74, or it would activate a bit which represents the command "flip", and thereby modulate the laser with a reverse pattern in relation to the bit pattern of this line in Table 74. In an alternative embodiment, the modulator would use this same information to select an exact bit pattern from a plurality of look-up tables. Shown below, for purposes of illustration only, is an exemplary decode table which could be used by the modulator in performing the above described examination:

DEFINITIONS

G = gray pixel
B = black pixel
W = white pixel
X = any shade of pixel (does not matter)
−2 = two pixels previous to current pixel
−1 = one pixel previous to current pixel
0 = current pixel
1 = next pixel after current pixel
2 = second pixel after current pixel.
Modulation could be based on the following criteria:

| Pixel | −2 | −1 | 0 | 1 | 2 | |
|-------|----|----|---|---|---|---|
|       | X  | W  | G | G | W | FILL FROM RIGHT SIDE OF PIXEL |
|       | W  | G  | G | W | X | FILL FROM LEFT SIDE OF PIXEL |
|       | X  | W  | G | B | X | FILL FROM RIGHT SIDE OF PIXEL |
|       | X  | B  | G | W | X | FILL FROM LEFT SIDE OF PIXEL |

Of course, other selection criteria may be applicable in differing systems.

For a specific example, let us assume that Pixel Sub-Element 72 is a four bit number which corresponds to a single output pixel, and which represents the number "6." The modulator receives the number "6" from the frame store and uses it to index Lookup Table 74. In this example, the number "6" corresponds to the sixth line of Table 74, Line 74e. If no context sensitive pixel modulation were to be performed, the modulator would use the exact bit pattern of Line 74e to modulate the laser and image the single output pixel.

However, in accordance with the preferred embodiment, the modulator examines the neighboring pixels to Pixel Sub-Element 72 prior to actually modulating the laser. That is, Neighboring Pixel Sub-Elements 78a and 78b are examined before a determination of the exact modulation pattern is made. Thus, let us assume that Neighboring Pixel Sub-Element 78a is a 4-bit number which corresponds to Line 74g of Table 74, and that Neighboring Pixel Sub-Element 78b is a 4-bit number which corresponds to Line 74i of Table 74. The modulator logic would "examine" Pixel Sub-Element 78a and determine that it has been imaged such that the portion of the pixel closest to Pixel Sub-Element 72 is white. Likewise, the modulator logic would "examine" Pixel Sub-Element 78b and determine that it is going to be imaged such that the portion of the pixel closest to Pixel Sub-Element 72 is black. The modulator logic would then activate a bit to signal the reverse of the bit pattern represented by Line 74e. Reversing this bit pattern produces a timing diagram for modulating the laser as illustrated by Output Pixel Modulation Diagram 76b. As is illustrated, Diagram 76b is actually the reverse of Diagram 76a. This effectively enables modulation of Pixel 72 such that the black portion of Pixel 72 is imaged against the black portion of Pixel 78b, and the white portion of Pixel 72 is imaged against the white portion of Pixel 78a.

Whereas the preferred embodiment of the present invention has been described above, it is contemplated that other alternatives and modifications may become apparent to those skilled in the art after having read the above disclosure. It is therefore intended that the appended claims be interpreted as covering all such alterations and modifications as fall within the true spirit and scope of the invention.

For example, the terms "white" and "black" have been used extensively throughout the explanation of the preferred embodiment. This has been done by way of example only to illustrate that a portion of an output pixel is actually imaged (i.e., toner is applied to the paper) and a portion of the pixel is left unimaged (i.e., the laser is off, and no toner is applied). It is certainly contemplated that the method of context sensitive pixel modulation described above is applicable to color systems as well. Additionally, other specific methods of adjusting individual output pixel modulation are contemplated. For example, a different type of lookup table could be used, and the shifting of the pixel modulation could be achieved by signaling the modulator to use a different line of the table in accordance with the neighboring pixel information.

What is claimed is:

1. A method for producing high definition images on an output medium comprising the steps of:
   generating a first set of image data of a first data type, said first set of image data encoded upon generation with a first set of values;
   generating a second set of image data of a second data type, different from said first data type, said second set of image data encoded upon generation with a second set of values, different from said first set of values;
   post-processing said first data type and said second data type in accordance with said first set of values and said second set of values, respectively, such that post-processing operations specifically suitable to only one of said data types are performed only on said one data type without affecting any other said data type.

2. A method as described in claim 1 wherein said first data type includes text and graphics data, and said second data type includes grayscale image data.

3. A method as described in claim 2 wherein said post-processing step includes anti-aliasing for improving the appearance of said text and graphics data.

4. A method as described in claim 1 wherein said first data type includes text and graphics data, and said second data type includes color image data.

5. A method as described in claim 4 wherein said post-processing step includes anti-aliasing for improving the appearance of said text and graphics data.

6. A method as described in claim 1 wherein said post-processing step includes context sensitive pixel modulation and further wherein said first set of values represents a plurality of multibit data pixels, each data pixel including imaging information for modulating a corresponding output pixel, said context sensitive pixel modulation comprising the sub-steps of:
   determining a first modulation pattern for a current output pixel using a corresponding first said multibit data pixel;
   determining a second modulation pattern for a first neighboring output pixel to said current pixel and a third modulation pattern for a second neighboring output pixel to said current pixel using a corresponding second and third said multibit data pixel, respectively;
   comparing said first modulation pattern with said second and third modulation patterns to determine the exact manner in which said current output pixel is to be imaged;
   modulating said current output pixel in accordance with said comparison; and,
   repeating each said step for each said output pixel until a final output image is completed.

7. A method as described in claim 6 wherein said first, second and third modulation patterns are determined using said first, second and third multibit data pixels, respectively, to index a lookup table containing exact bit sequences for modulating each corresponding said output pixel.

8. A method as described in claim 7 wherein said first neighboring output pixel is disposed to the left of said current output pixel and said second neighboring output pixel is disposed to the right of said current output pixel.

9. A method as described in claim 7 wherein an exact bit sequence from said lookup table corresponding to said current output pixel is either directly used to modulate said current output pixel or is reversed and used to modulate said current output pixel according to said comparison.

10. A method for producing high definition images on an output medium comprising the steps of:
   encoding a first data type with a first set of values;
   encoding a second data type with a second set of values, different from said first set of values;
   storing said first set of values and said second set of values in a frame store;
   reading said first set of values and said second set of values from said frame store when a predetermined portion of said frame store has been filled;
   post-processing said first data type and said second data type according to said first set of values and said second set of values, respectively, such that post-processing operations specifically suitable to one of said data types are performed only on said one data type without affecting any other said data type, said post-processing step thus producing modulation patterns for an output marking device;
   modulating said marking device with said modulation patterns to produce a final output image.

11. A method as described in claim 10 wherein said first data type includes text data and said second data type includes grayscale image data.

12. A method as described in claim 11 wherein said post-processing step includes anti-aliasing for improving the appearance of said text data.

13. An apparatus for producing high definition images on an output medium comprising:
   means for generating a first set of image data of a first data type, said first set of image data encoded upon generation with a first set of values;
   means for generating a second set of image data of a second data type, different from said first data type, said second set of image data encoded upon generation with a second set of values, different from said first set of values;
   means for post-processing said first data type and said second data type in accordance with said first set of values and said second set of values, respectively, such that post-processing operations specifically suitable to only one of said data types are performed only on said one data type without affecting any other said data type.

14. An apparatus as described in claim 13 wherein said first data type includes text and graphics data, and said second data type includes grayscale image data.

15. An apparatus as described in claim 14 wherein said post-processing step includes anti-aliasing for improving the appearance of said text and graphics data.

16. An apparatus as described in claim 13 wherein said first data type includes text and graphics data, and said second data type includes color image data.

17. An apparatus as described in claim 16 wherein said post-processing step includes anti-aliasing for improving the appearance of said text and graphics data.

18. An apparatus as described in claim 13 wherein said post-processing means includes means for performing context sensitive pixel modulation and further wherein said first set of values represents a plurality of encodings including imaging information for modulating a plurality of corresponding output pixels, said context sensitive pixel modulation means comprising:
   determining means for determining a set of modulation patterns for a current output pixel based on said encodings;
   selecting means, coupled to said determining means, for selecting from said set of modulation patterns a preferred modulation pattern for said current output pixel based on encoding information of said current output pixel's neighboring pixels; and,
   modulating means, coupled to said selecting means, for modulating said current output pixel in accordance with said preferred modulation pattern.

19. An apparatus as described in claim 18 wherein said modulation patterns are determined using said encodings to index a lookup table containing exact bit sequences for modulating said output pixels.

20. An apparatus as described in claim 19 wherein said neighboring output pixels include a first neighboring output pixel disposed to the left of said current output pixel and a second neighboring output pixel disposed to the right of said current output pixel.

21. An apparatus as described in claim 19 wherein an exact bit sequence from said lookup table corresponding to said current output pixel is either directly used to modulate said current output pixel or is reversed and used to modulate said current output pixel according to said selection.

* * * * *